(12) United States Patent
Morihara et al.

(10) Patent No.: US 7,079,671 B2
(45) Date of Patent: Jul. 18, 2006

(54) AUTHENTICATION METHOD, AND PROGRAM AND APPARATUS THEREFOR

(75) Inventors: Takashi Morihara, Kawasaki (JP); Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 799 days.

(21) Appl. No.: 10/281,237

(22) Filed: Oct. 28, 2002

(65) Prior Publication Data

US 2003/0161502 A1 Aug. 28, 2003

(30) Foreign Application Priority Data

Feb. 25, 2002 (JP) .............................. 2002-047491

(51) Int. Cl.
*G06K 9/00* (2006.01)

(52) U.S. Cl. ..................... 382/124; 382/115

(58) Field of Classification Search ........ 382/115–118, 382/124, 181, 190, 209, 284; 340/5.52, 5.53; 713/186; 902/3
See application file for complete search history.

(56) References Cited

U.S. PATENT DOCUMENTS

| 6,182,892 | B1* | 2/2001 | Angelo et al. ............... 235/380 |
| 6,317,508 | B1 | 11/2001 | Kramer et al. .............. 382/124 |
| 6,459,804 | B1* | 10/2002 | Mainguet ..................... 382/124 |
| 6,898,301 | B1* | 5/2005 | Iwanaga ...................... 382/124 |
| 6,917,694 | B1* | 7/2005 | Machida et al. ............. 382/124 |
| 6,980,669 | B1* | 12/2005 | Uchida ........................ 382/115 |
| 2002/0049714 | A1* | 4/2002 | Yamazaki et al. .............. 707/1 |

OTHER PUBLICATIONS

Lee "A 600-dpi Capacitive Fingerprint Sensor Chip and Image-Synthesis Technique", IEEE, vol. 34, No. 4, Apr. 1999, pp. 469-475.*

* cited by examiner

*Primary Examiner*—Daniel Miriam
(74) *Attorney, Agent, or Firm*—Staas & Halsey LLP

(57) ABSTRACT

Section images of a human body part are continuously input by relative movement with respect to a read unit in an image input step, a living body section image including a character shape from an input section image group in a character area section step, and, when living body section images which include character shapes which are chronologically continuous are selected, the living body section images are connected to each other to generate a connected living body image in an image connection step. In the collation step, the connected living body image including the character shapes and living body section images which include character shapes which are not connected to each other are collated with a corresponding portion in reference information of a human body part which is registered in advance to authenticate an identical person.

15 Claims, 19 Drawing Sheets

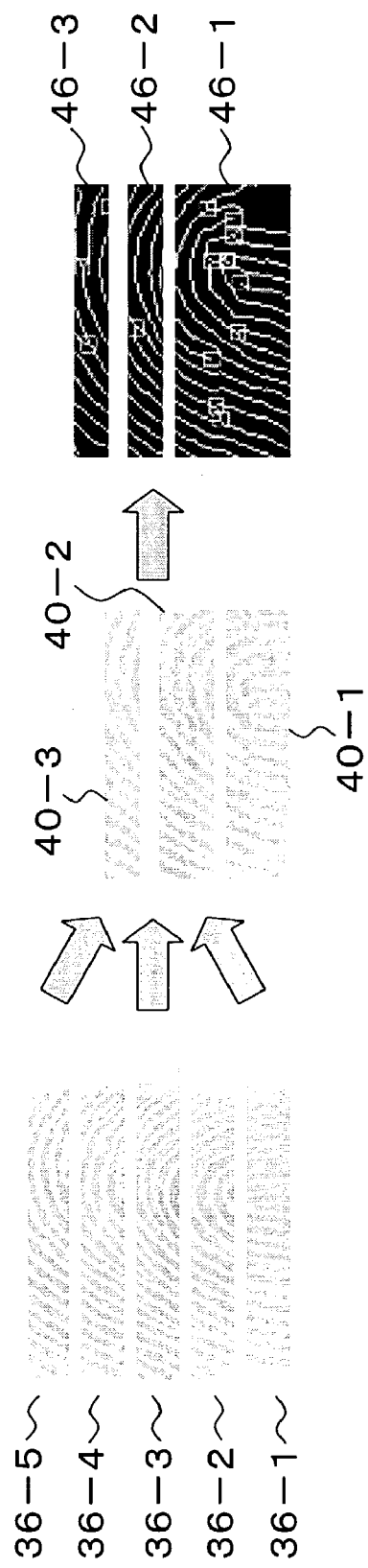

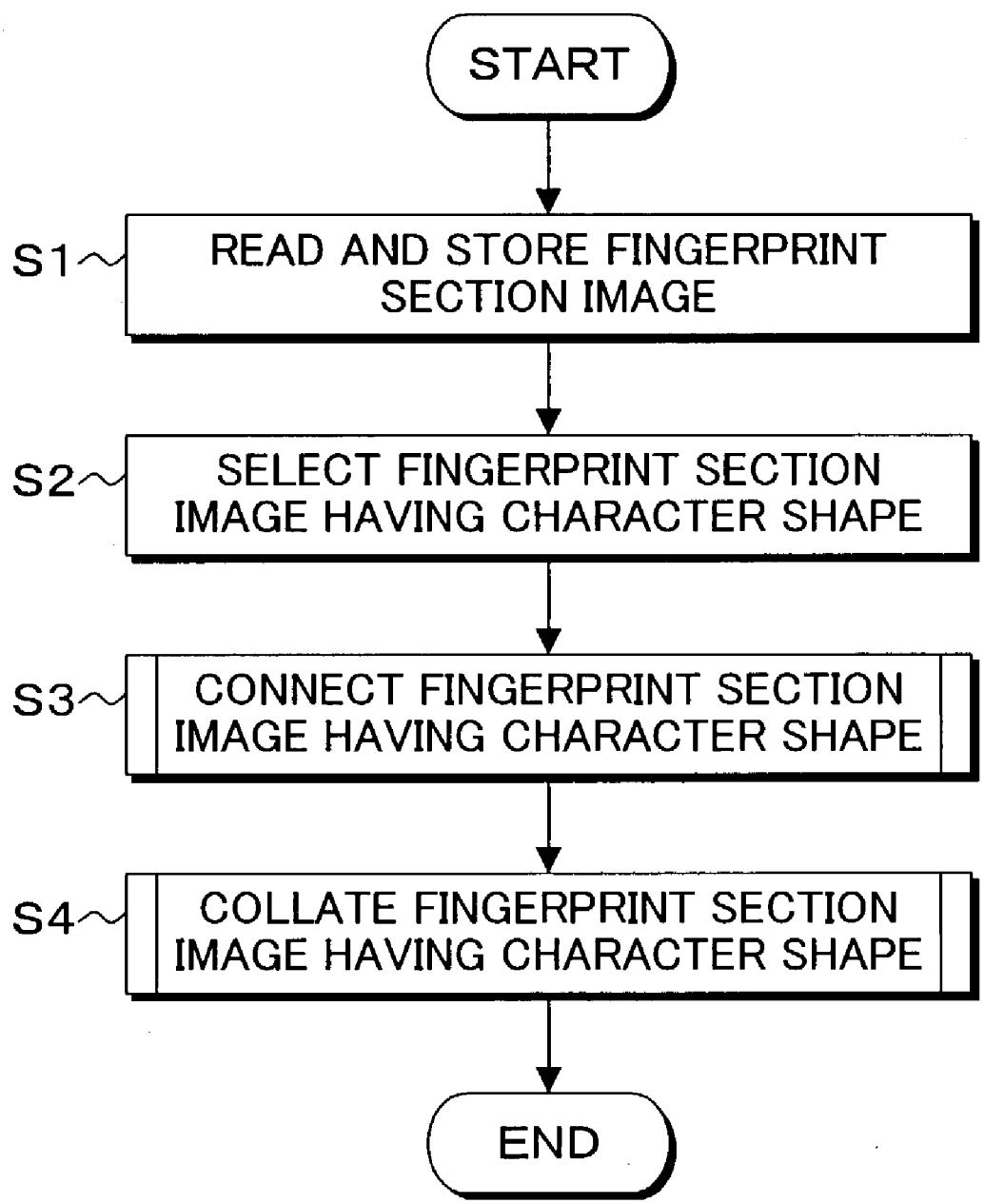

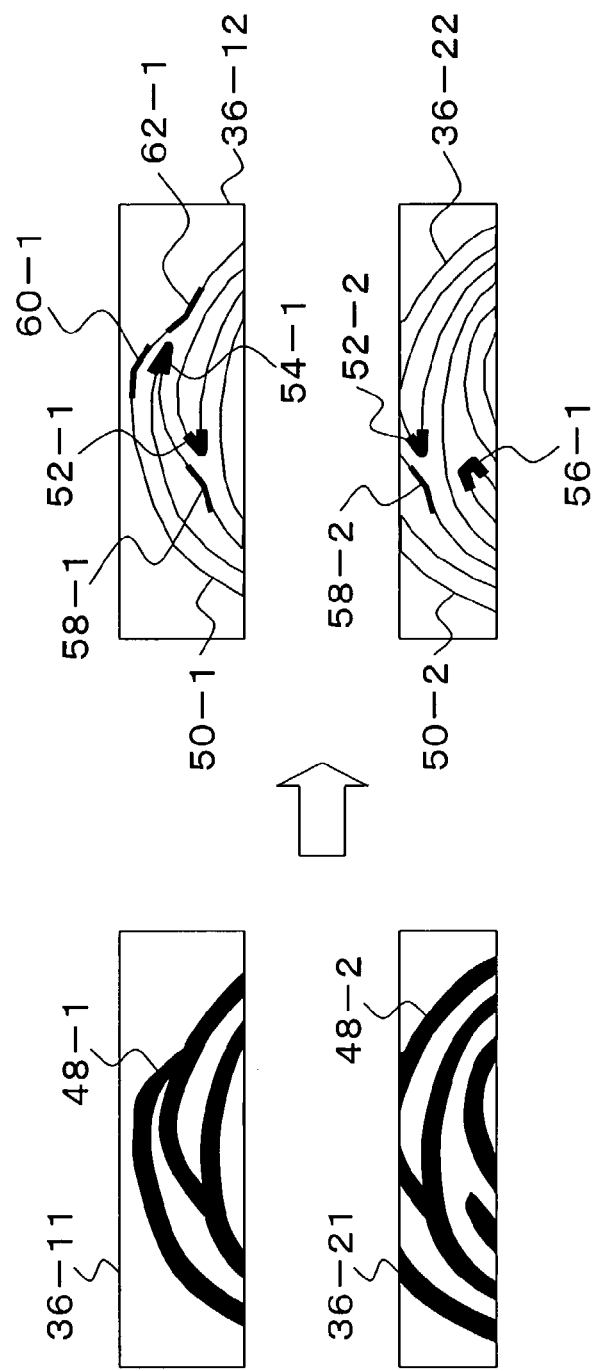

FIG. 9A
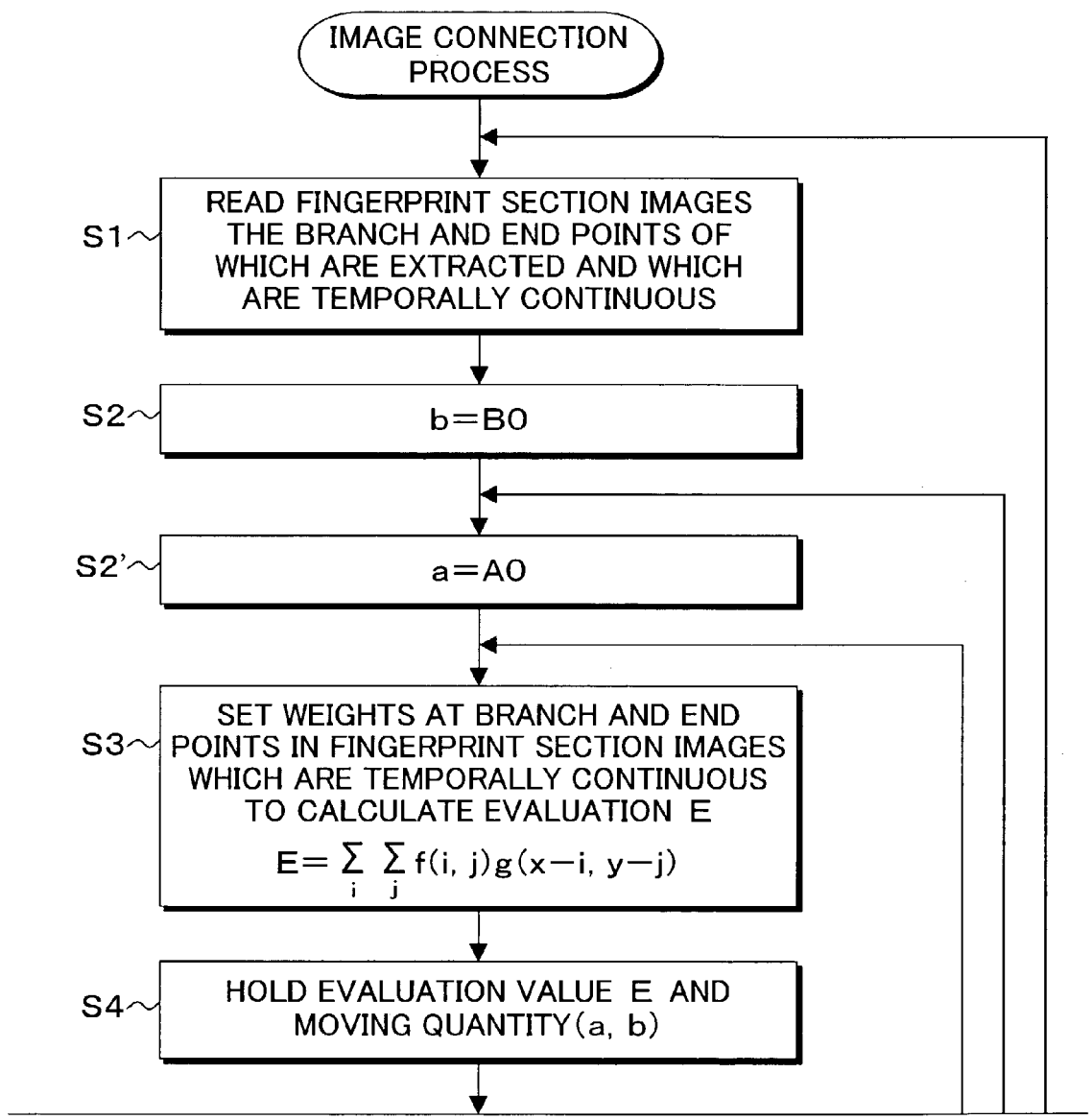

FIG. 9B
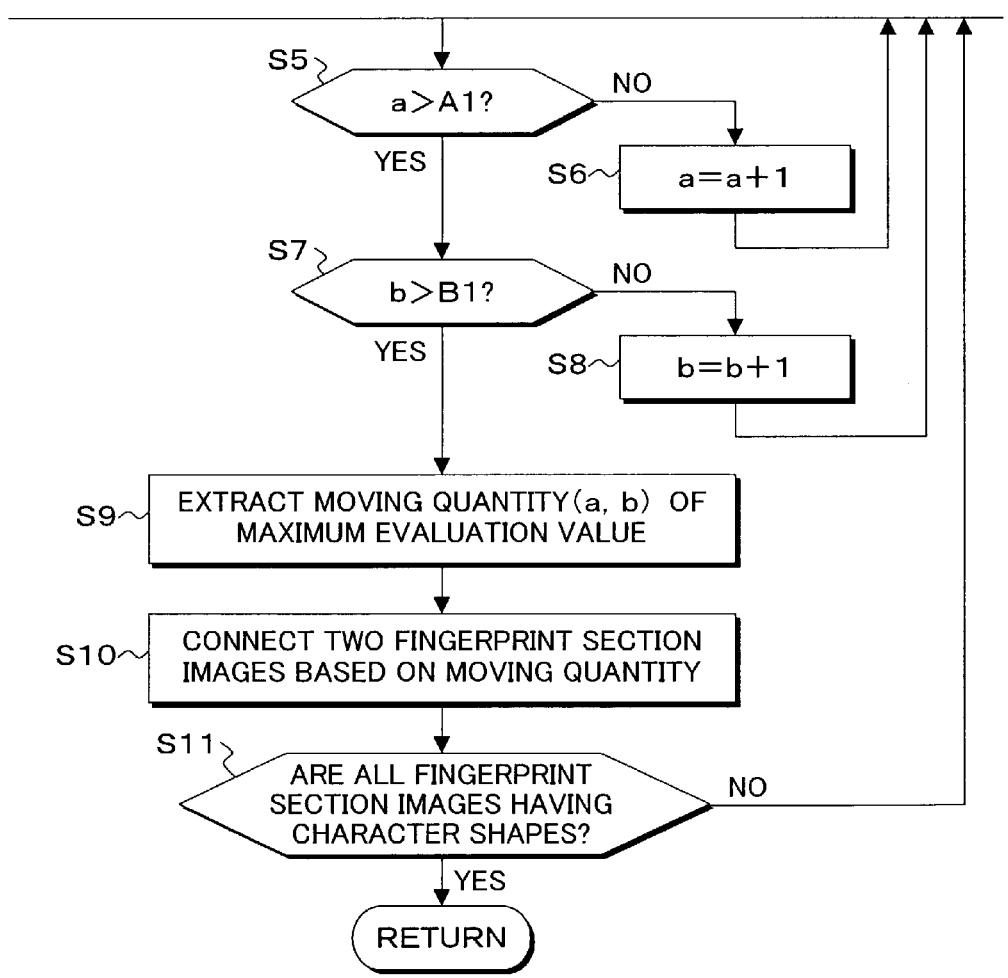

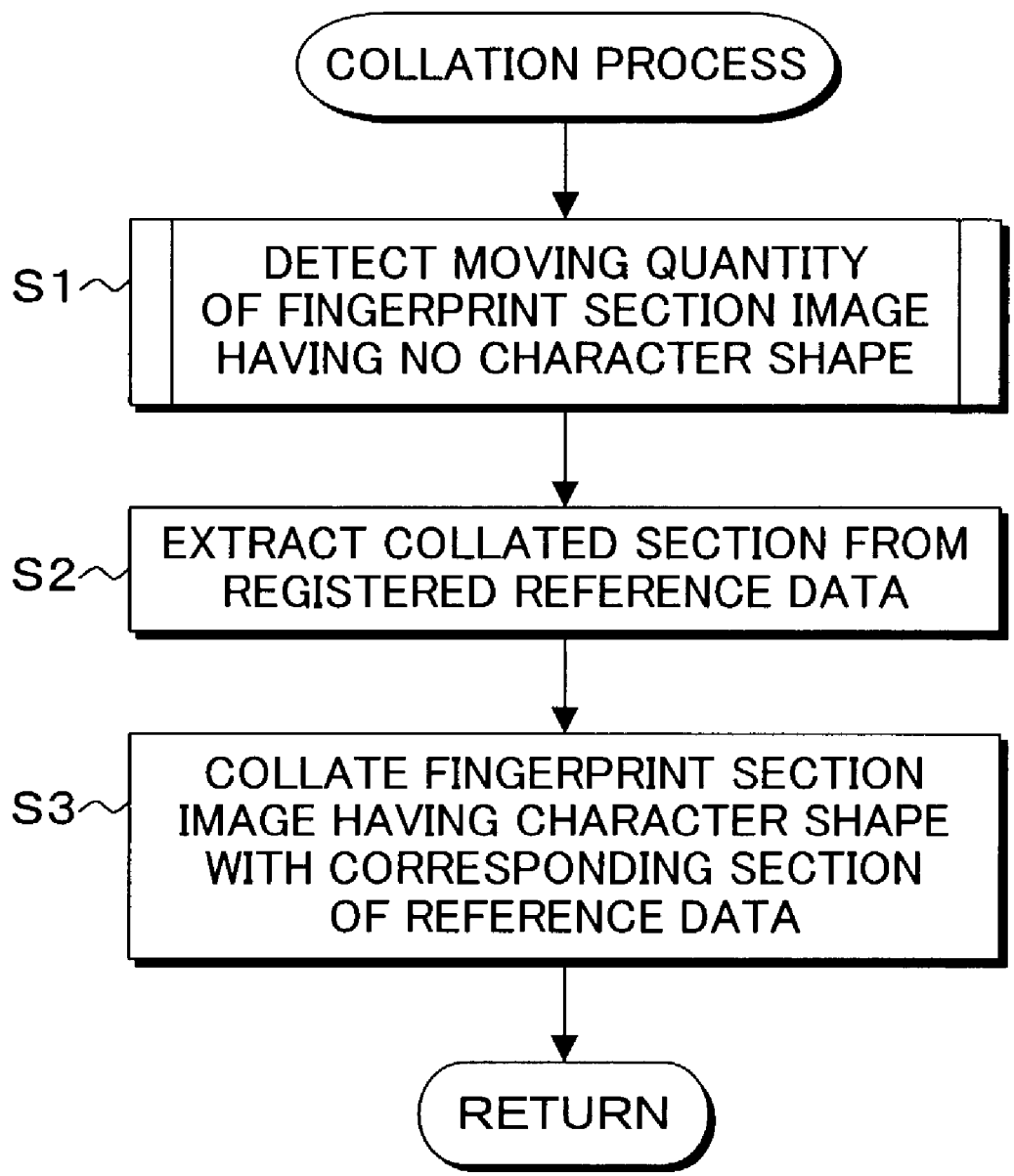

FIG. 12B
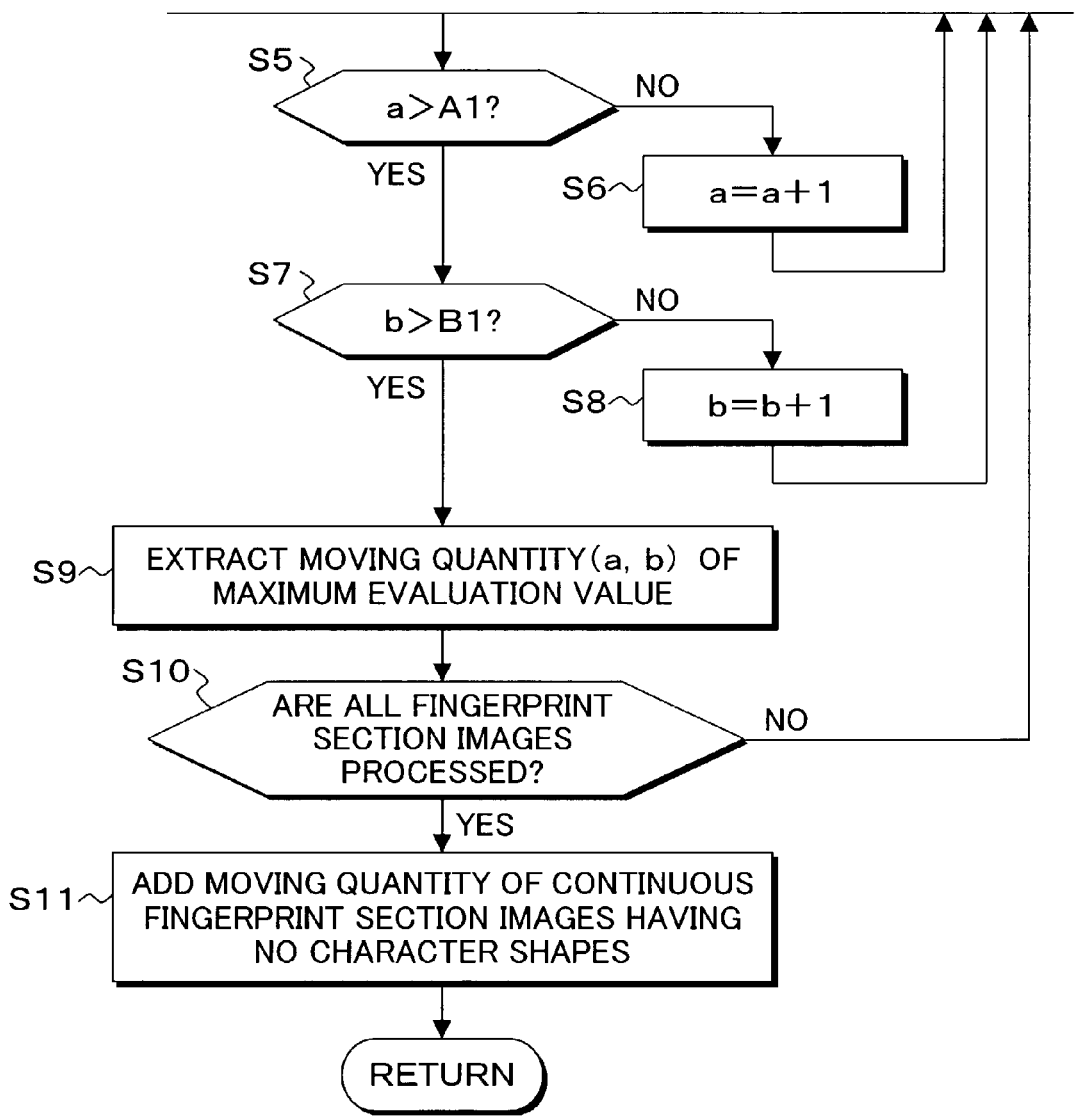

○ INTERESTED CHARACTER
□ NEARBY CHARACTER

AUTHENTICATION METHOD, AND PROGRAM AND APPARATUS THEREFOR

BACKGROUND OF THE INVENTION

1. Field of the Invention

The present invention relates to an authentication method which continuously picking sectional fingerprint images or the like by a small sensor to authenticate an identical person, and a program and an apparatus therefor and, more particularly, to an authentication method which uses living body information and which selects a section image including a characteristic shape from continuously picked section images to authenticate an identical person, and a program and an apparatus therefor.

2. Description of the Related Arts

In recent years, with achievement of multi-function and high-performance of portable phones and personal digital assistants (PDA) or the like, a lot of important information such as internal consumption information and personal information can be easily carried. For this reason, an electronic device such as a portable phone requires strong security. For example, a device which prevents recorded information from being seen by a person except for a holder of an electronic device is required.

At the present, biometrics authentication which uses fingerprints, irises, voiceprints, signatures, and the like for reliably checking holders in place of IDs and passwords has attracted attentions. In the biometrics authentication, unique and individual characters or habits are directly detected by a human body in advance and registered in a system. When authentication is to be performed, a unique and individual character or habit is detected and compared with a registered character or habit to identify the person. In the biometrics authentication, since a machine directly observes a human body, theft and falsification are difficult more than in authentication using passwords. Therefore, security higher than that in the authentication using passwords can be maintained.

However, in the biometrics authentication, security higher than that in ID or password authentication can be provided. However, a sensor for detecting a character of a human body is disadvantageously large. For example, in fingerprint authentication, a fingerprint sensor having a size almost equal to that of a fingertip is required. Portable phones and PDAs have been highly integrated and considerably miniaturized.

For this reason, a sufficient space for mounting the fingerprint sensor is not left. Therefore, in order to cause a portable phone or a PDA to have a fingerprint recognition function, the fingerprint sensor must be more miniaturized.

For this reason, in order to apply an authentication technique while keeping the same usability as that in a conventional art, a method using a small sensor is proposed. As a conventional individual checking system using a fingerprint sensor, for example, a "fingerprint input apparatus" disclosed in Japanese Unexamined Patent Publication No. 8-263631 is known. In this conventional art, a rotatable cylindrical waveguide is used as a contact medium to a finger of a subject to make a contact portion of the finger of the subject movable, and an entire finger print is input by rotational scanning through an image pickup device. A rotational angle of the cylindrical waveguide at this time is detected by a rotational angle detection means. On the basis of the detected rotational angle, images are connected as a correct fingerprint image by image processing of an image processing means to reconstruct the fingerprint image. The rotational cylindrical waveguide is used as the contact medium to a finger to miniaturize optical components, so that considerable miniaturization is realized.

However, in such a conventional fingerprint input apparatus, a small sensor is used. However, the fingerprint input apparatus measures an amount of movement of a finger, and fingerprint images are connected to each other on the basis of the measurement result. For this reason, a mechanism for detecting an amount of movement of a finger except for a sensor for picking fingerprint images is required, and the miniaturization and cost reduction of the apparatus are not easily realized.

In addition, as another conventional art which does not require a detection mechanism except for a sensor for picking fingerprint images, an art disclosed in Japanese Patent No. 2971296 is known.

In this conventional art, each line input from a one-dimensional sensor is compared with an image which has been input to extract an amount of character, and similar images are discriminated from each other to be used in checking. However, in a method of picking fingerprint images by using the one-dimensional sensor, when input conditions, i.e., a change in velocity of a finger, horizontal blurring, a difference between an amount of left movement and an amount of right movement, and a curve of a locus change, it is difficult to reconstruct fingerprint images to be input. As a result, checking data which is different from an original amount of character is generated, and a rate of rejecting identical persons at which the fingers of identical persons erroneously rejected increases.

When a checking standard is moderated to increase a rate of accepting identical persons, a rate of accepting different persons at which different persons are erroneously recognized as identical persons disadvantageously increases. In addition, input images are compared with other images in units of lines, an amount of calculation increases, and a high-speed process cannot be realized. In addition, since an entire image is reconstituted by a plurality of section images which are continuously picked by a small sensor, a lot of trouble and a log time are taken with image processing for reconstitution disadvantageously.

SUMMARY OF THE INVENTION

According to the present invention, there is provided an authentication method which uses living body information and which accurately connects necessary image areas from input images such as sectional fingerprint images which are continuously picked by a small sensor for a compact device such as a portable phone to perform collation at a high speed and a high accuracy, and a program and an apparatus therefor.

The present invention is an authentication method using living body information, including:

the image input step of continuously inputting section images of a human body part by relative movement with respect to a read unit;

the character area selection step of selecting a living body section image which includes a character shape from an input section image group;

the image connection step of, when living body section images which include the character shapes which are chronologically continuous are selected, connecting both the living body section images to each other to generate a connected living body image; and the collation step of collating the connected living body image including the character shapes and living body section images which include character shapes which are not connected to each other with a corresponding portion in reference information of a human body part which is registered in advance to authenticate an identical person. In this case, the character area selection step extracts, as the character shapes of the living body section images, any one of end points and branch points of fingerprint ridges, fingerprint ridge edge lines, portions where changes of tangent directions of the fingerprint ridge edge lines are large, or a combination thereof when the living body section images are fingerprint section images. According to the authentication method of the present invention, only fingerprint section images which include character shapes such as branch points or end points of fingerprint ridges from a plurality of input images, e.g., a plurality of fingerprint section images picked as section images are selected, if the fingerprint section images including the character shapes include two fingerprint section images which are chronologically continuous, the two fingerprint section images are connected to each other, and a connected fingerprint image and a single fingerprint section image is collated with a corresponding portion of the registered fingerprint reference information, so that an identical person can be decided efficiently by using character shapes as subjects. In particular, since fingerprint section images which do not include character shapes are excluded from the subjects of connection and collation, in comparison with a case in which an entire image is reconstituted by connecting all fingerprint section images and collated with registered reference information, a processing load and a memory capacity to be used are reduced, and processing can be performed at a high speed.

In the character area selection step, the character shapes of the respective living body section images are detected, and the number of character shapes is counted, and a living body section image having character shapes the number of which is not less than a predetermined number may be selected.

In the image connection step, common areas are searched by correlative calculation of character shapes in overlapping areas while relatively moving two living body section images which are chronologically continuous to detect relative amounts of movement of the images, and the two living body section images are connected to each other by using the detected amounts of movement. Since the common areas are searched by using branch points or end points serving as character shapes of, e.g., fingerprint ridges as subjects, matched portions of two fingerprint section images which are chronologically continuous can be accurately detected even though noise or distortion of images is generated, and the section image can be connected to each other at a high accuracy.

The collation step includes the moving amount detection step of detecting an amount of movement of a living body section image which does not include the character shape with respect to a living body section image which includes the character shape, and the collation reference extraction step of extracting a portion used in collation from the living body reference information on the basis of the amount of movement. In this case, in the moving amount detection step using the living body section image which does not include a character shape as a subject, common areas are searched by correlative calculation of edge lines in overlapping areas while relatively moving two living body section images which are chronologically continuous to detect relative amounts of movement of the images, and a sum of amounts of movement is calculated depending on the number of continuous living body section images which do not include character shapes. In this manner, in the present invention, a relative relationship between, e.g., a fingerprint section image which does not include a character shape and a fingerprint section image which includes a character shape is calculated by detecting an amount of movement of a finger, and the fingerprint section image which does not a character shape is used to cut and extract a portion used in collation from the registered fingerprint reference information by using the amount of movement of the positional relationship.

In the authentication method according to the present invention, the character area selection step selects some areas which include character shapes from a living body section image which includes a character shape, and the image connection step may connect the some areas which include the character shapes and which are selected from living body section images which are chronologically continuous to generate a connected living body image.

More specifically, according to the present invention, fingerprint section images which include character shapes are selected and connected to each other to perform collation. However, as another aspect of the present invention, some areas which include character shapes in fingerprint section images are cut and extracted, and the character section areas are connected to each other to perform collation. For this reason, in comparison with a case in which the fingerprint section images which include character shapes are selected and connected to each other to perform collation, an identical person can be efficiently decided at a high accuracy by concentrating processing subjects on a small range.

The present invention provides a program for authentication using living body information. This program causes a computer to execute:

the image input step of continuously inputting section images of a human body part by relative movement with respect to a read unit;

the character area selection step of selecting a living body section image which includes a character shape from an input section image group;

the image connection step of, when living body section images which include character shapes which are chronologically continuous are selected, connecting both the living body section images to each other to generate a connected living body image; and the collation step of collating the connected living body image including the character shapes and living body section images including character shapes which are not connected to each other with a corresponding portion in reference information of a human body part which is registered in advance to authenticate an identical person.

The present invention provides an authentication apparatus which uses living body information. This authentication apparatus includes: an image input unit for continuously inputting section images of a human body part by relative movement with respect to a read unit; a character area selection unit for selecting a living body section image which includes a character shape from an input section image group; an image connection unit for, when living body section images which include character shapes which are chronologically continuous are selected, connecting both the living body section images to each other to generate a connected living body image; and a collation unit for collating the connected living body image including the character shapes and living body section images including character shapes which are not connected to each other with a corresponding portion in reference information of a human body part which is registered in advance to authenticate an identical person.

The above and other objects, features, and advantages of the present invention will become more apparent from the following detailed description with reference to the drawings.

BRIEF DESCRIPTION OF THE DRAWINGS

FIG. 5 is a diagram for explaining a concrete example of fingerprint section images, a reconstituted image having a character shape, and collation patterns in an authentication process according to the present invention.

FIG. 6 is a flow chart of a basic procedure of an authentication method according to the present invention;

FIGS. 8A and 8B are diagrams for explaining character extraction of fingerprint section images in the present invention;

FIGS. 9A and 9B show a detailed flow chart of an image connection process in FIG. 6;

FIG. 11 is a detailed flow chart of a collation process in FIG. 5;

FIGS. 12A and 12B show a flow chart of a moving amount detection process of a fingerprint section image which does not have a character shape in FIG. 11;

DETAILED DESCRIPTION OF THE PREFERRED EMBODIMENT

Figure 1:
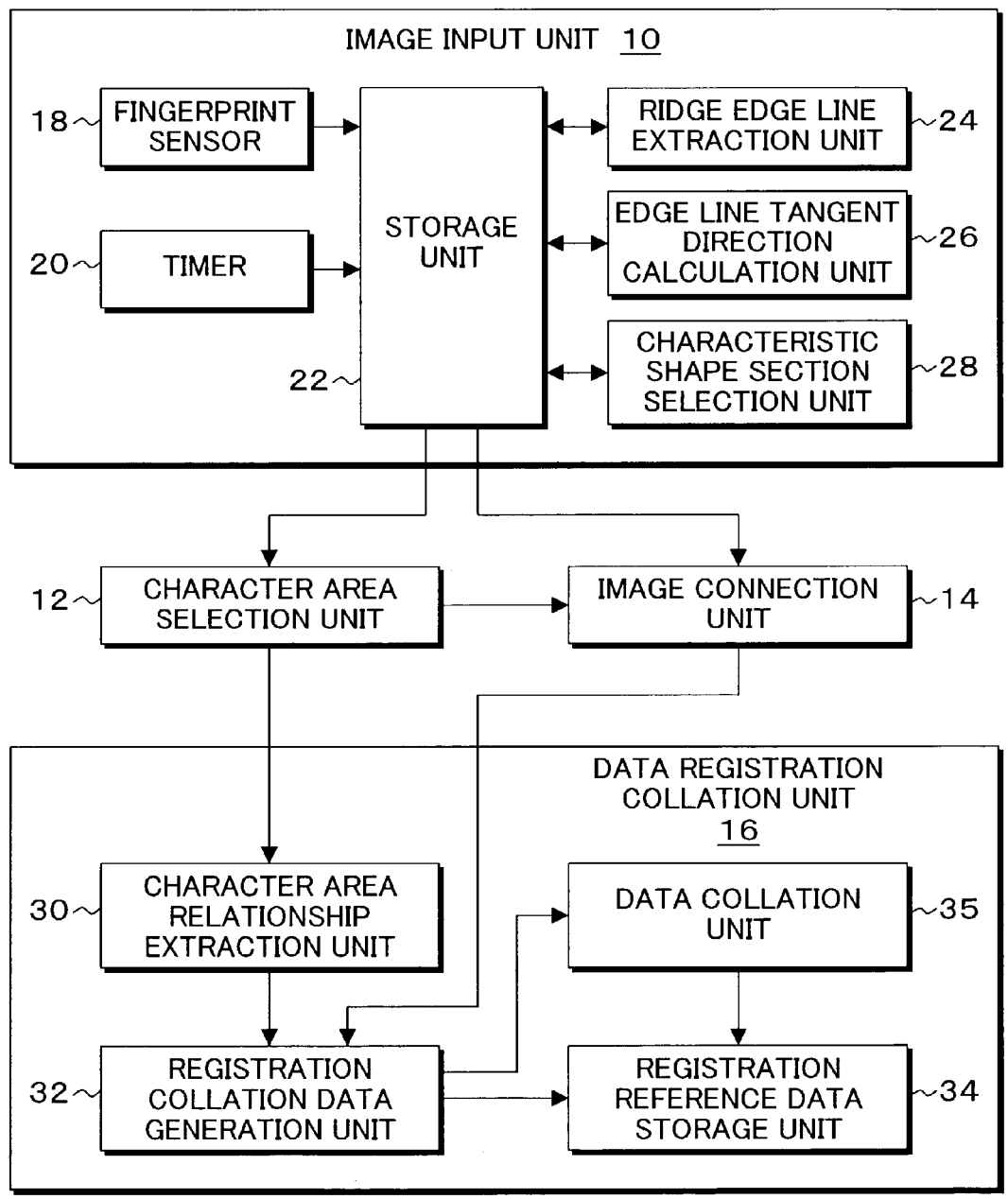
FIG. 1 is a block diagram of a function configuration of an authentication apparatus according to the present invention.

FIG. 1 is a block diagram of a function configuration of an authentication apparatus according to the present invention. The authentication apparatus according to the present invention is constituted by an image input unit 10, a character area selection unit 12, an image connection unit 14, and a data registration/collation unit 16. In this embodiment, the authentication apparatus using a fingerprint as a human body part is exemplified.

The image input unit 10 continuously inputs section images of a fingerprint by relative movement with respect to a read unit. The character area selection unit 12 selects, as a character area, a fingerprint section image which includes a predetermined character shape from an input fingerprint section image group. When fingerprint section images which include character shapes which are chronologically continuous are selected, the image connection unit 14 connects both the section images to each other to generate a connected fingerprint image of the character areas. In addition, the data registration/collation unit 16 collates the connected fingerprint image which includes character shapes and fingerprint section images which include character shapes which are not connected to each other with a corresponding portion in fingerprint reference images which are registered in advance to authenticate an identical person.

In addition, the configuration in FIG. 1 will be described below. In the image input unit 10, a fingerprint sensor 18, a timer 20, a storage unit 22, a ridge edge line extraction unit 24, an edge line tangent direction calculation unit 26, and a characteristic shape section selection unit 28 are arranged. In the data registration/collation unit 16, a character area relationship extraction unit 30, a registration collation data generation unit 32, a registration reference data storage unit 34, and a data collation unit 35 are arranged. The fingerprint sensor 18 arranged in the image input unit 10 functions as an image read unit. A finger is pressed on a sensor read surface and slid on the sensor read surface, so that fingerprint section images are continuously read to be stored in the storage unit 22. As the fingerprint sensor 18, a fingerprint sensor which has a resolution of 500 dpi and which has a dot size (256×32) in which 256 dots are arranged in a horizontal direction and 32 dots are arranged in a vertical direction is used. The fingerprint sensor 18 has about 12.5 mm in the horizontal direction and about 1.5 mm in the vertical direction. The timer 20 outputs time information. Pieces of photographing time information are connected to the fingerprint section images continuously read by the fingerprint sensor 18, and are stored in the storage unit 22.

In the image input unit 10, image processing is performed to fingerprint section images loaded on the storage unit 22 to extract characteristic shapes of fingerprint ridges. In the present invention, the following characters in the fingerprint ridges are extracted.

(1) Edge line serving as contour of fingerprint ridge
(2) Portion where change of tangent direction in ridge edge line is sharp
(3) End point and branch point on ridge line In accordance with the three types of character extraction, the ridge edge extraction unit 24, the edge line tangent direction calculation unit 26, and the characteristic shape section selection unit 28 are arranged.

Figure 2:
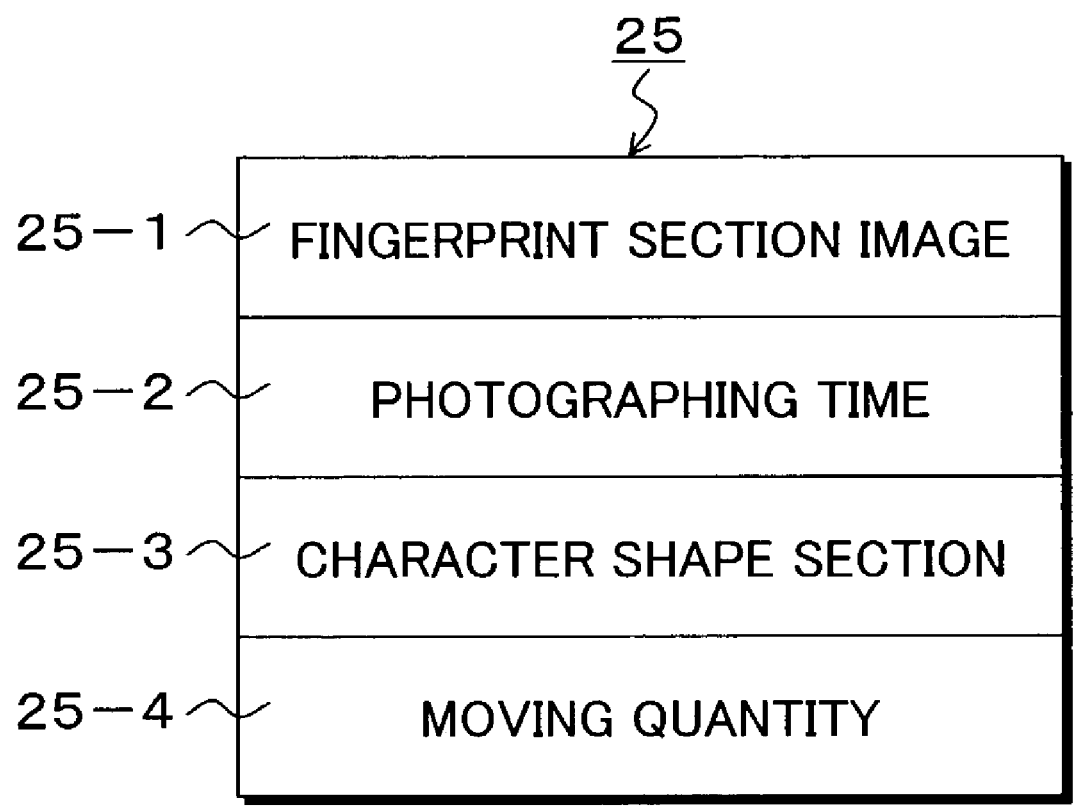
FIG. 2 is a diagram for explaining a data structure stored in a storage unit in FIG. 1.

FIG. 2 shows a data structure 25 of each fingerprint section image stored in the storage unit 22. In the data structure 25, a fingerprint section image 25-1, a photographing time 25-2 obtained from the timer 20, a characteristic shape section 25-3 such as an ridge edge line which is extracted as character, a portion where a change of a tangent direction of the ridge edge line is large, or an end point or a branch point of the ridge edge line, and an amount of movement 25-4 which is detected by the image connection unit 14 or the character area relationship extraction unit 30 shown in FIG. 2 and which will be apparent in the following description are stored.

Figure 3:
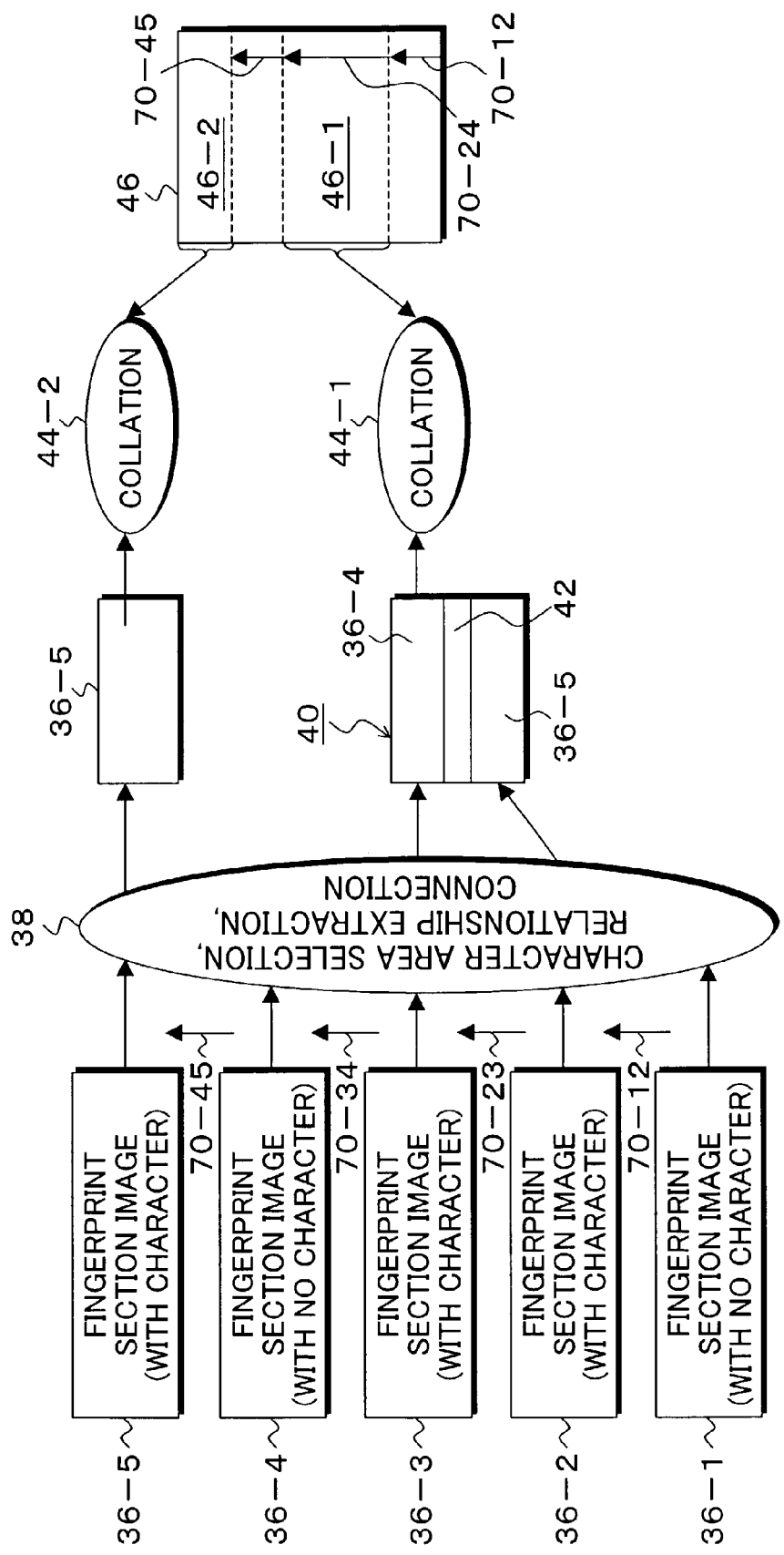
FIG. 3 is a diagram for explaining selection, connection, and collation of fingerprint section images having character.

FIG. 3 shows an outline of a procedure in the authentication apparatus in FIG. 1. It is assumed that five fingerprint section images 36-1 to 36-5 are continuously read by the fingerprint sensor 18. When branch points and end points of fingerprint ridges are extracted as character portions in the fingerprint section images 36-1 to 36-5, although the character portions exist in the three fingerprint section images 36-2, 36-3, and 36-5, and it is assumed that the two character portions do not exist in the fingerprint section images 36-1 and 36-4. In this case, in the process of area selection, relationship extraction, and freezing 38 according to the present invention, the three fingerprint section images 36-2, 36-3, and 36-5 having character portions are selected from the five input fingerprint section images 36-1 to 36-5.

With respect to the three fingerprint section image 36-2, 36-3, and 36-5 selected as described above, the fingerprint section images 36-2 and 36-3 which are chronologically continuous are subjected to image connection to generate a reconstituted fingerprint image 40. Since the fingerprint section images 36-1 and 36-5 is not chronologically continuous with any fingerprint section image, the fingerprint section image 36-5 is not subjected to image connection and is read as a single character area. On the other hand, in the two fingerprint section images 36-1 and 36-4 which do not have character portions, in order to specify positional relationships with the fingerprint section images 36-2, 36-3, and 36-5, moving vectors 70-12, 70-23, 70-34, and 70-45 which represent amounts of movement of a finger between the images. As will be apparent in the following description, the moving vectors between the images can be detected by searching common areas in two adjacent images. Subsequently, collations 44-1 and 44-2 are performed such that the reconstituted fingerprint image 40 and the fingerprint section image 36-5 selected as character areas are collided with registration reference data 46 which is registered in advance.

In these collations, an extraction process for cutting portions corresponding to the reconstituted fingerprint image 40 and the fingerprint section image 36-5 from the registration reference data 46 is performed. The extraction from the registration reference data 46 is performed by using moving vectors 70-12, 70-23, 70-34, and 70-45 detected in relationship extraction for the character areas. A reference data collation area 46-1 used in a collation 40-1 with the reconstituted fingerprint image 40 is extracted as an area extending from the position of the moving vector 70-12 between the fingerprint section images 36-1 and 36-2 to a moving vector 70-24 obtained by adding the moving vector 70-34 between the fingerprint section images 36-3 and 36-4 to the moving vector 70-23 between the fingerprint section images 36-2 and 36-3. As registration reference data 46-2 used in the collation 44-2 of the fingerprint section image 36-5, a remaining area is extracted from the position of the moving vector 70-45 between the fingerprint section images 36-4 and 36-5 subsequent to the added moving vector 70-24. In this manner, for example, by the collations 44-1 and 44-2 between the reconstituted fingerprint image 40 and the fingerprint section image 36-5 which include end points and branch points of fingerprint ridge lines as character shapes and the corresponding reference data collation areas 46-1 and 46-2 in the registration reference data 46, authentication for checking an identical person is performed.

Figure 4:
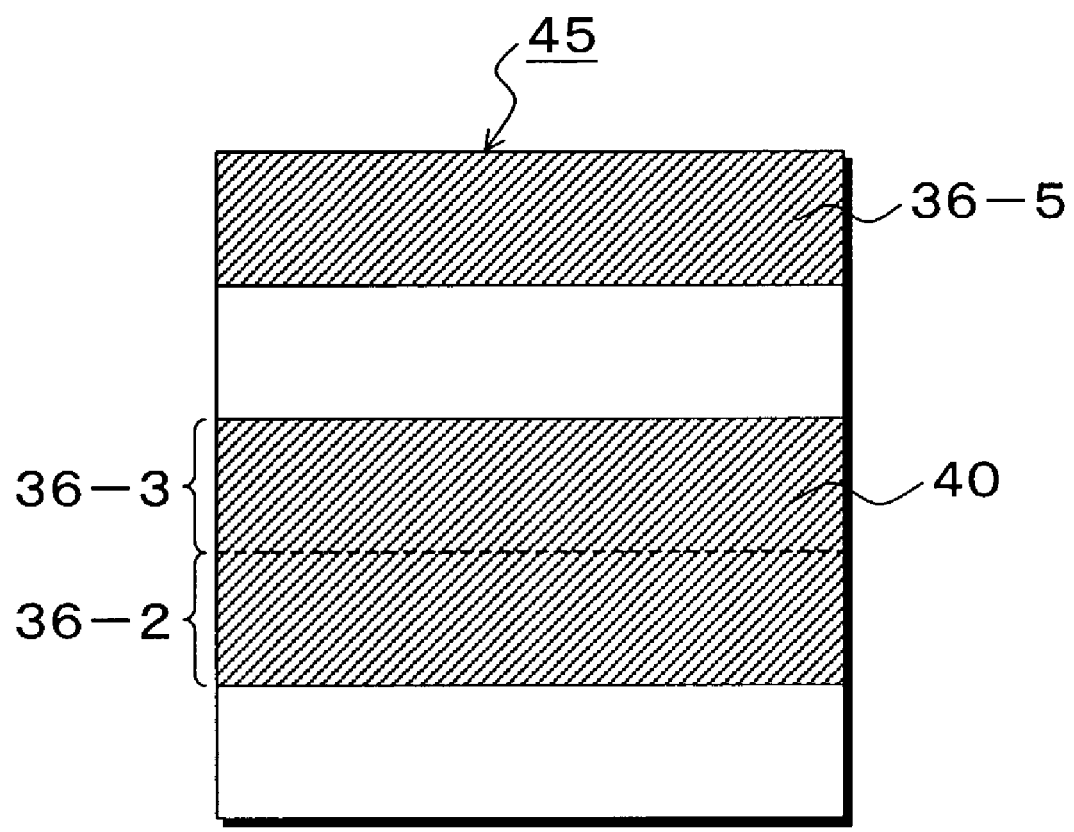
FIG. 4 is a diagram for explaining a reconstituted fingerprint image having a character shape and fingerprint section images in an entire image.

FIG. 4 is a diagram for explaining a connected reconstituted fingerprint image and a fingerprint section image which have character shapes in an entire fingerprint image 45 in the authentication process in FIG. 3. In comparison with a case in which the entire fingerprint image 45 is reconstituted to perform collation, some character areas including character shapes, i.e., collation is concentrically performed to the areas of the reconstituted fingerprint image 40 and the fingerprint section image 36-5 having a character shape. For this reason, a processing amount of collation is reduced, and a processing load is reduced, so that a collation process can be performed at a high speed.

FIG. 5 shows a concrete example of a fingerprint section image, a reconstituted image having a character shape, and a collation reference pattern in the authentication process according to the present invention. In this concrete example, the five fingerprint section images 36-1 to 36-5 are loaded by the fingerprint sensor 18. Of these fingerprint section images 36-1 to 36-5, a fingerprint section image including a character shape is selected, reconstituted fingerprint images 40-1 to 40-3 are generated by connection. In the reconstituted fingerprint images 40-1 to 40-3, for example, when ridge binary images are thinned to be converted into skeletal lines, collation is performed by using collation reference patterns 46-1 to 46-3 registered as patterns of skeletal lines. For example, collation of a branch point surrounded by a square frame in the collation patterns 46-1 to 46-3 is performed to check an identical person.

FIG. 6 is a flow chart of a basic procedure of an authentication method according to the present invention. This flow chart also expresses a procedure of a program for authentication according to the present invention. In step S1, section images of a fingerprint are continuously read by relative movement of a finger wit respect to the fingerprint sensor 18 and stored in the storage unit 22. Since the fingerprint section images from the fingerprint sensor 18 are multi-valued images, the fingerprint section images are stored in the storage unit 22 and binarized. Furthermore, extraction of edge lines of ridges, extraction of portions where changes of edge line tangent directions are large, extraction of branch points and end points in the edge lines, and the like are performed by the ridge edge line extraction unit 24, the edge line tangent direction calculation unit 26, and the characteristic shape section selection unit 28.

The data structure 25 shown in FIG. 3 is formed for each fingerprint section image. In step S2, a fingerprint section image having a predetermined character shape is selected from a plurality of fingerprint section images stored in the storage unit 22.

Figure 7A:
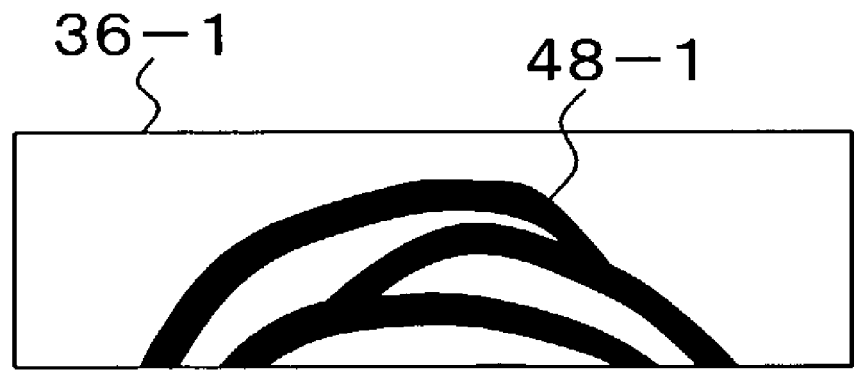
FIGS. 7A and 7B are diagrams for explaining a fingerprint section image having a character shape and a fingerprint which does not have a character shape.
Figure 7B:
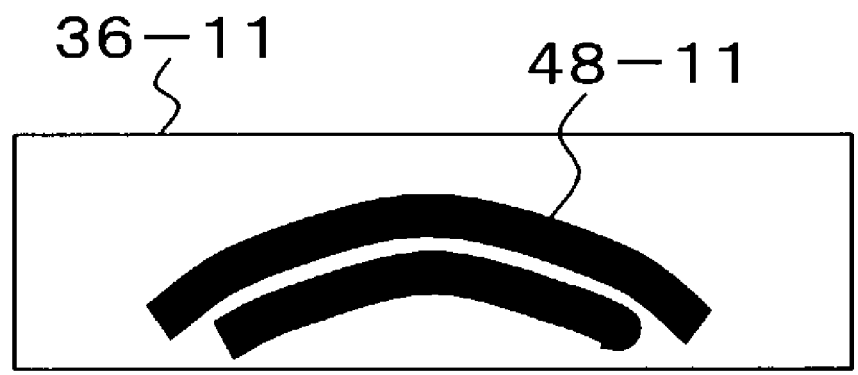

FIGS. 7A and 7B show examples of a fingerprint section image which has a character portion and a fingerprint section image which does not have a character portion. A fingerprint ridge 48-1 included in the fingerprint section image 36-1 in FIG. 7A has a branch point and includes a character portion. In contrast to this, a fingerprint section image 36-11 in FIG. 7B includes only two fingerprint ridges 48-11, and does not include a characteristic portion. In the authentication process according to the present invention, only the fingerprint section image 36-1 including a character shape as shown in FIG. 8A is selected.

FIGS. 8A and 8B show an example of character extraction of fingerprint section images according to the present invention. The fingerprint section image 36-11 in FIG. 8A has a binarized fingerprint ridge 48-1. When an edge line indicating a contour is extracted from the fingerprint ridge 48-1, the pattern of a ridge edge line 50-1 like a fingerprint section image 36-12 is obtained. When a change of a tangent direction is detected in the ridge edge line 50-1, portions 52-1, 54-1, 58-1, 60-1, and 62-1 where changes of tangent directions are large are extracted. In this case, the width of the line increases in proportion to the change of the tangent direction. Of these portions, portions where the changes of the tangent directions are maximum are branch points 52-1 and 54-1. For this reason, branch points are set as character shapes in the present invention, and a condition that the number of branch points set as character images is, e.g., 1 or more is set as a selection condition. In this case, since the fingerprint section image has the two branch points 52-1 and 54-1, the fingerprint section image is selected as a fingerprint section image of a character area.

FIG. 8B shows a fingerprint section image 36-21 adjacent to the fingerprint section image 36-11 in FIG. 8A and has a binarized fingerprint ridge 48-2.

When an edge line serving as a boundary is extracted from the fingerprint ridge 48-2, the pattern of a ridge edge line 50-2 like a fingerprint section image 36-22 is obtained. When a change of a tangent direction is detected in the ridge edge line 50-2, portions 52-2, 56-1, and 58-2 where changes are large can be extracted. The change of the tangent direction expresses the thickness of the line. As portions where changes of tangent directions are large, branch points 52-2 and 56-1 are included in the fingerprint section image. Since even the fingerprint section image 36-22 has two branch points 52-2 and 56-1, the fingerprint section image 36-22 satisfies the selection condition, and is selected as a character area. Referring to FIG. 6 again, when the selection of fingerprint section images having character shapes are completed in step S2, a connection process of the selected fingerprint section images having the character shapes is executed in step S3.

FIGS. 9A and 9B show a detailed flow chart of the image connection process in step S3 in FIG. 6.

In step S1, two fingerprint section images from which character shapes are extracted and which are chronologically continuous are loaded in step S1.

For example, fingerprint section images 36-12 and 36-22 from which edge lines shown in FIG. 9 are loaded.

Figure 10B:
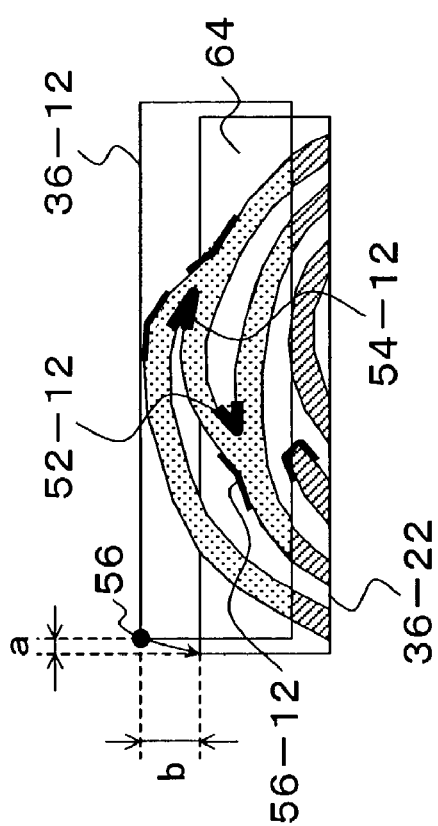
FIGS. 10A and 10B are diagrams for explaining a moving range of fingerprint section images and correlative calculation in common area searching for image connection.
Figure 10A:
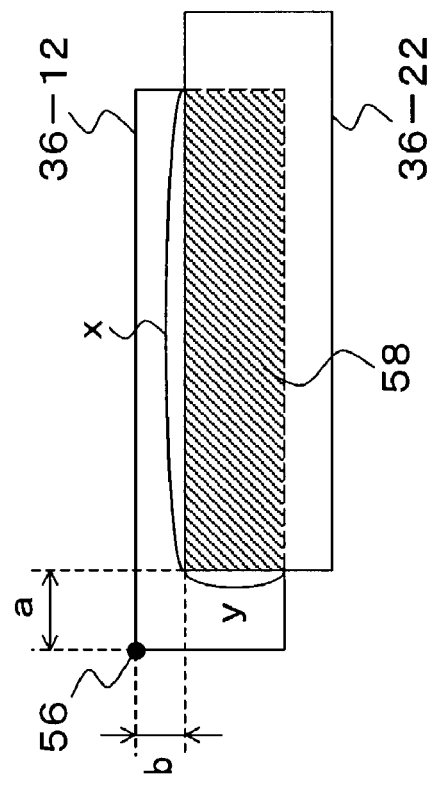

FIGS. 10A and 10B show positional relationships in common area searching of the two loaded fingerprint section images 36-12 and 36-22 having character shapes subjected to the image connection process in FIG. 10. In FIG. 10A, one fingerprint section image 36-12 is fixed to a two-dimensional plane having an origin 56 as a connection source.

In contrast to this, while the other fingerprint section image 36-22 is moved as a connection destination in units of pixels in horizontal and vertical directions, correlative calculation of an evaluation value in the overlapping areas 58 can be performed. In this case, an amount of horizontal movement of the fingerprint section image 36-22 which is the connection destination for the fingerprint section image 36-12 which is fixedly arranged is represented by a, and an amount of vertical movement is represented by b, moving ranges are defined as follows:

A0≦a≦A1
B0≦b≦B1.

More specifically, when a sensor having a resolution of 500 dpi and a dot size (256×32) in which 256 dots are arranged in a horizontal direction and 32 dots are arranged in a vertical direction is used, it is assumed that the maximum moving velocity of a finger is 8 cm/sec and that a sampling frequency of the fingerprint sensor 18 is 100 Hz. In this case, for example, moving ranges of the image are defined as follows:

−10 dots≦a≦10 dots
0 dot≦b≦20 dots.

FIG. 10B shows a state in which the fingerprint section image 36-12 is moved with respect to the fingerprint section image 36-22 fixed to the origin 56 to completely match the overlapping areas 64. A moving vector (a, b) constituted by the amount of horizontal movement a and the amount of vertical movement b with respect to the origin 56 when the overlapping areas 64 completely match is detected as an amount of movement of the finger between the two images.

In the image connection process 10 in FIGS. 9A and 9B, in steps S2 and S2', as shown in FIG. 10A, the fingerprint section image 36-22 which is relatively moved with respect to the fingerprint section image 36-12 fixed to the origin 56 is set at an initial position expressed by b=B0 and a=A0. In step S3, weights are set to a branch point and an end point which are character shapes in fingerprint section images which are chronologically continuous, and an evaluation value E is calculated by correlative calculation using the following equation:

$$E = \sum_i \sum_j f(i, j)g(x-i, y-j). \quad (1)$$

In this equation, f(i, j) and g(x−i, y−j) indicate the fingerprint section image 36-12 and the fingerprint section image 36-22, respectively. For example, when the fingerprint section images 36-12 and 36-22 on the right of FIGS. 10A and 10B are exemplified, weights w=1 are set to branch points 52-1 and 54-1 of the fingerprint section image 36-12, and weights of 0 are set to the other points. Weights w=1 are set to the branch points 52-2 and 56-1 in the fingerprint section image 36-22, and weights of 0 are set to the other points. On the basis of the weighting, correlative calculation for calculating a sum of products of Equation (1) is performed to calculate the evaluation value E.

The evaluation value E increases as the area of the matched portions increases.

In step S4, the calculated evaluation value E and an amount of movement (a, b) obtained at this time are stored. When the amount of movement a is A1 or less in step S5, the amount of movement a is increased by 1 pixel in step S6. Returning to step S3 again, the evaluation value E and an amount of movement are calculated at the next moving position.

When the amount of movement a reaches A1 in step S5, the control flow shifts to step S7, and the amount of movement b is increased by 1 pixel in step S8. Thereafter, returning to step S2', the same process as described above is repeated. When the amount of movement b reaches B1 in step S7, the control flow shifts to step S9, the amount of movement of the maximum evaluation value, i.e., amounts of movement (a, b) corresponding to an evaluation value which is maximum when the overlapping areas 58 completely match as shown in FIG. 10B is extracted from the evaluation value E calculated in the overlapping areas. In step S10, the two fingerprint section images are adjusted to each other on the basis of the amount of movement of the maximum evaluation value as shown in FIG. 10B and connected to each other by overwriting of pixels of the overlapping portions 58 or storage of an average value or the like of pixels to generate a reconstituted image having a character shape. Subsequently, upon completion of processing of all the fingerprint section images having character shapes which are chronologically adjacent to each other in step S11, the control flow returns to the main routine in FIG. 7.

When the reconstituted fingerprint image is generated by connecting fingerprint section images having character shapes in step S3 in FIG. 6, a collation process of the fingerprint section images having the character shapes is performed in step S4.

This collation process is performed by the procedure of the detailed flow chart in FIG. 11.

In the collation process in FIG. 11, an amount of movement of a fingerprint section image which does not have a character shape is detected in step S1. In step S2, a collated portion is extracted from the registered reference data. In step S3, the corresponding portion of the fingerprint section image having the character shape is collated with the corresponding portion of a reference fingerprint section image to check an identical person.

FIG. 12 is a detailed flow chart of a moving amount detection process for a fingerprint section image which does not have a character shape in step S1 in FIG. 11. In this moving amount detection process, in order to detect an amount of movement of the fingerprint section image which does not have a character shape with respect to the fingerprint section image having a character shape, the process is performed to all the fingerprint section images loaded in step S1 in FIG. 6. As the character portions for the common area searching, a branch point or an end point is not included in a ridge edge line as in the common area searching in the image connection process shown in FIGS. 9A and 9B. For this reason, the ridge edge line itself is used as a character portion to perform correlative calculation.

Figure 12A:
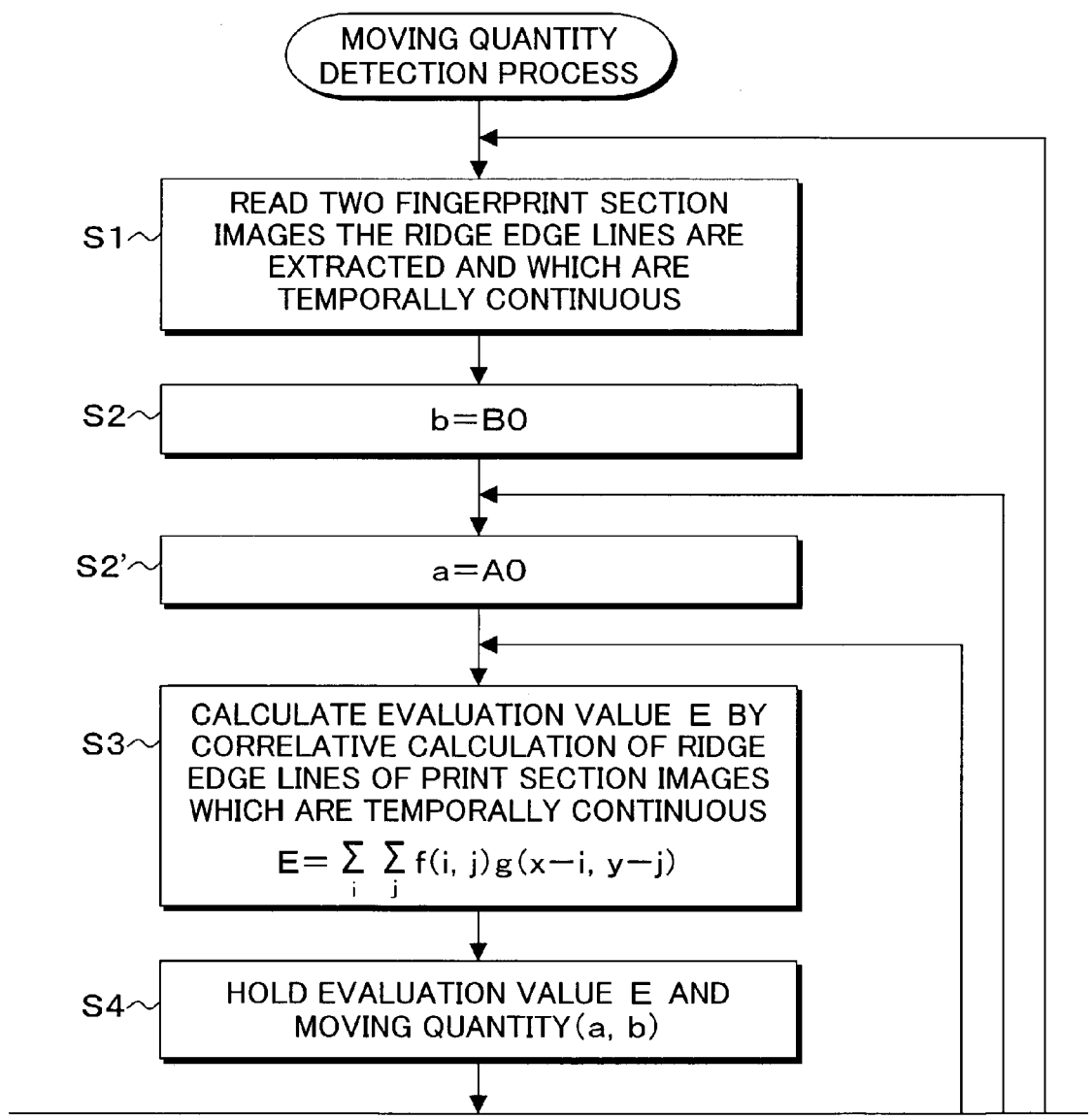

In FIGS. 12A and 12B, two fingerprint section images from which ridge edge lines are extracted in step S1 and which are chronologically continuous are loaded. Subsequently, in steps S2 and S2", as shown in the searching range in FIG. 10A, amounts of movement a and b of a fingerprint section image which moves with respect to one fingerprint section image fixed to the origin 56 are set at initial positions A0 and B0, respectively. In step S3, correlative calculation of ridge edge lines of the two fingerprint section images which are chronologically continuous is performed to calculate an evaluation value E as the following equation:

$$E = \sum_i \sum_j f(i, j) g(x-i, y-j). \quad (2)$$

In step S4, the calculated evaluation value E and the amounts of movement (a, b) are stored. These processes in steps S3 and S4 are repeated until the amount of movement a reaches A1 in step S5 while the amount of movement a is increased pixel by pixel in step S6.

When the amount of movement a reaches A1 in step S5, the control flow shifts to step S7, and the processes of step S2' and the subsequent steps until the amount of movement b reaches B1 while the amount of movement b is increased pixel by pixel in step S8. When the amount of movement b reaches B1 in step S7, correlative calculation in all the set moving ranges A0 to A1 and B0 to B1 is completed.

For this reason, the maximum evaluation value of the evaluation values E calculated in step S9 is decided as a state in which the common areas of the two fingerprint section images completely match, amounts of movement (a, b) obtained at this time are extracted. The processes in steps S1 to S9 are repeated until all the fingerprint section images are processed in step S10. When fingerprint section images which do not have character shapes are continuous in step S11, an amount of movement obtained by adding amounts of movement of the respective fingerprint section images is calculated, the control flow returns to the routine in FIG. 11.

The amounts of movement of the fingerprint section images which do not have character shapes and which calculated by the moving amount detection process in FIGS. 12A and 12B, i.e., the additional vector 70-24 of the moving vectors 70-12, 70-23, and 70-34, and the moving vector 70-45 in FIG. 3 are calculated, and extraction for cutting the registration reference data 46-1 and 46-2 corresponding to the reconstituted fingerprint image 40 and the fingerprint section image 36-5 which include character shapes from the registration reference data 46 registered in the process in step S2 in FIG. 11. On the basis of the extraction result, collation is performed in step S3 in FIG. 11 to check an identical person.

Figure 13:
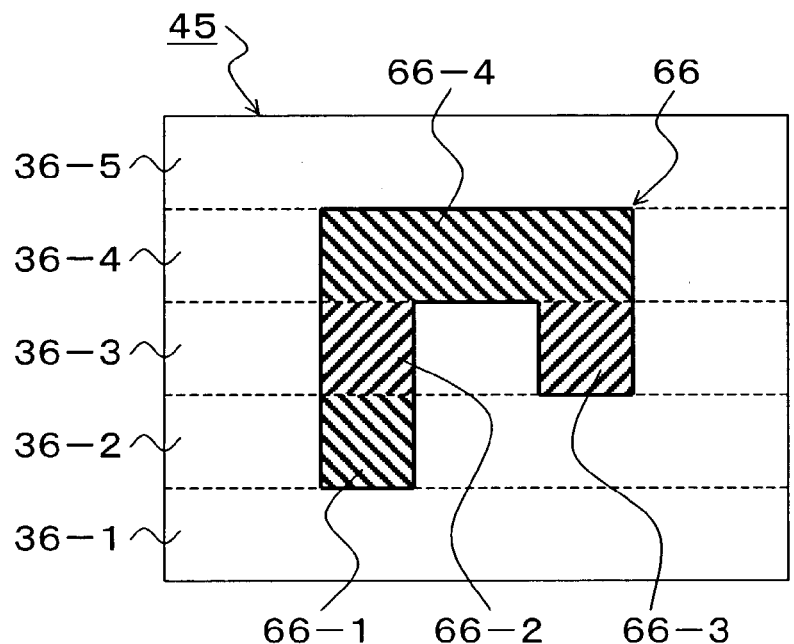
FIG. 13 is a diagram for explaining another selection of reconstitution performed by connecting character area portions of fingerprint section images.

FIG. 13 shows an embodiment of another extraction process of an area having a character shape from an entire fingerprint image in the authentication process according to the present invention. In this embodiment, as character areas in the entire fingerprint image 45 constituted by connecting the fingerprint section images 36-1 to 36-5, fingerprint section images are not selected, and partial areas including character shapes in one fingerprint section image are selected and connected to each other. For example, a character partial area 66-1 is extracted from the fingerprint section image 36-2, character partial areas 66-2 and 66-3 are selected from the fingerprint section image 36-3, and a character partial area 66-4 is selected from the fingerprint section image 36-4. The connection process according to the present invention is performed to the character partial areas 66-1 to 66-4 selected as described above to generate a character reconstituted area 68. The area of the registration reference data corresponding to the character reconstituted area 64 is extracted to perform collation, so that an identical person is checked.

Figure 14:
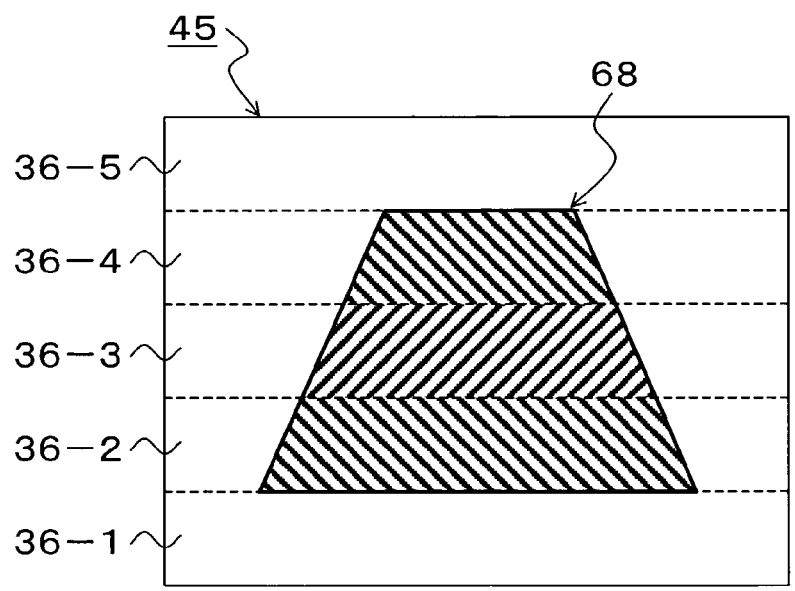
FIG. 14 is a diagram for explaining another embodiment in which character areas to be selected are designated to an entire image.

FIG. 14 shows another embodiment of a character area to an entire fingerprint image in the authentication according to the present invention.

In this embodiment, the character reconstituted area 68 is set in the entire fingerprint image 45, and portions of the set character reconstituted area 68 in the fingerprint section images 36-1 to 36-5 loaded by the fingerprint sensor 18 are selected and connected to each other to generate a reconstituted image. The reconstituted image is collated with corresponding registration reference data to check an identical person.

In the embodiment, in common area searching in the connection process of the fingerprint section image having character shapes in FIGS. 9A and 9B, branch points and end points at which changes of tangent directions of fingerprint ridge edge lines are large are set as character shapes, and weights are set to only the character shapes, so that an evaluation value E is calculated by correlative calculation. However, as another common area searching process, correlative calculation may be performed such that the weights are increased in proportion to the degree of character. For example, when the fingerprint section image 36-12 and 36-22 on the right in FIGS. 8A and 8B are exemplified, a weight w=0 is set to a background portion, a weight w=1 is set to edge lines 50-1 and 50-2, a weight w=2 is set to portions 58-1, 58-2, 60-1, and 62-1 where changes of tangent directions of edge lines are large to some extent, and a weight w=4 is set to branch points 52-1, 52-2, 54-1, and 56-1 at which changes of tangent directions are large.

In this manner, the evaluation value E may be calculated by correlative calculation.

Similarly, in correlative calculation for common area searching of fingerprint section images which do not have character shapes in FIGS. 12A and 12B, in addition to the calculation of Equation (2) for edge lines, the correlative calculation of Equation (2) is performed to ridge binary patterns such as fingerprint section images 36-11 and 36-21 on the left in FIGS. 8A and 8B to calculate an evaluation value, and common areas may be extracted.

In the above embodiment, the edge lines of the ridges are used as characteristic portions of fingerprint ridge shapes. However, the ridges may be thinned to be converted into skeletal lines expressed by the center lines of the ridges, and a connection process of fingerprint section images having character shapes may be performed to the fingerprint skeletal lines.

The above embodiment exemplifies a fingerprint image as a living body image. However, the present invention can also be applied to a case in which the authentication process is performed to venous stria vascularis, voiceprints, voice types, face images, ear shapes, or irises.

In the above embodiment, a sum of products of pixels at an overlapping position of two fingerprint section images is calculated as correlative calculation for searching common areas. However, another correlative calculation, for example, a sum of errors, a sum of square errors, or the like at which equal evaluation values decrease may be calculated.

Figure 15:
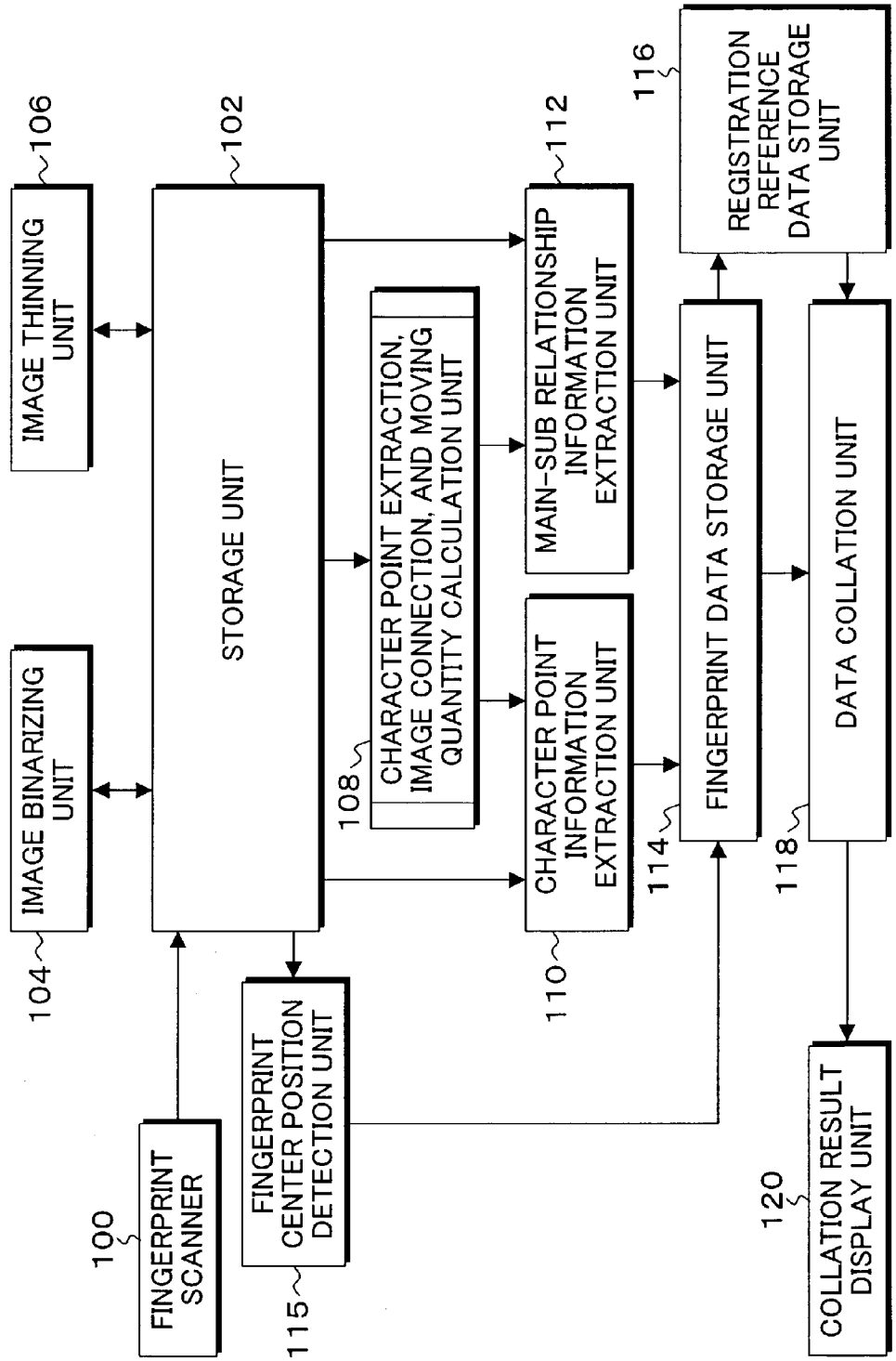
FIG. 15 is a block diagram of an embodiment of an authentication apparatus according to the present invention.

FIG. 15 is a block diagram of an authentication apparatus according to another embodiment of the present invention. In this embodiment, fingerprint collation is performed by using a positional relationship between character points included in connected living body section images.

This authentication apparatus comprises, as an image input unit, a fingerprint scanner 100, a storage unit 102, an image binarizing unit 104, and an image thinning unit 106. The fingerprint scanner 100 incorporates the fingerprint sensor 18 and the timer 20 in FIG. 1 therein. A character point extraction, image connection, and moving amount calculation unit 108, like the character area selection unit 12 and the image connection unit 14 in FIG. 1, fingerprint section images having character shapes are selected and connected to each other, and an amount of movement between the fingerprint section images is detected. In addition, as a data collation registration unit, a character point information extraction unit 110, a main-sub relationship information extraction unit 112, a fingerprint data storage unit 114, a fingerprint center position detection unit 115, a registration reference data storage unit 116, a data collation unit 118, and a collation result display unit 120 are arranged. In this embodiment, relationships between character points included in the connected living body section images are collided with each other. As information to be collated, a positional relationship between an interested character point and another character point in connected or independent different fingerprint section images, e.g., information of at least one of a distance, a direction, a vector, and the like is used to perform fingerprint collation.

Figure 16:
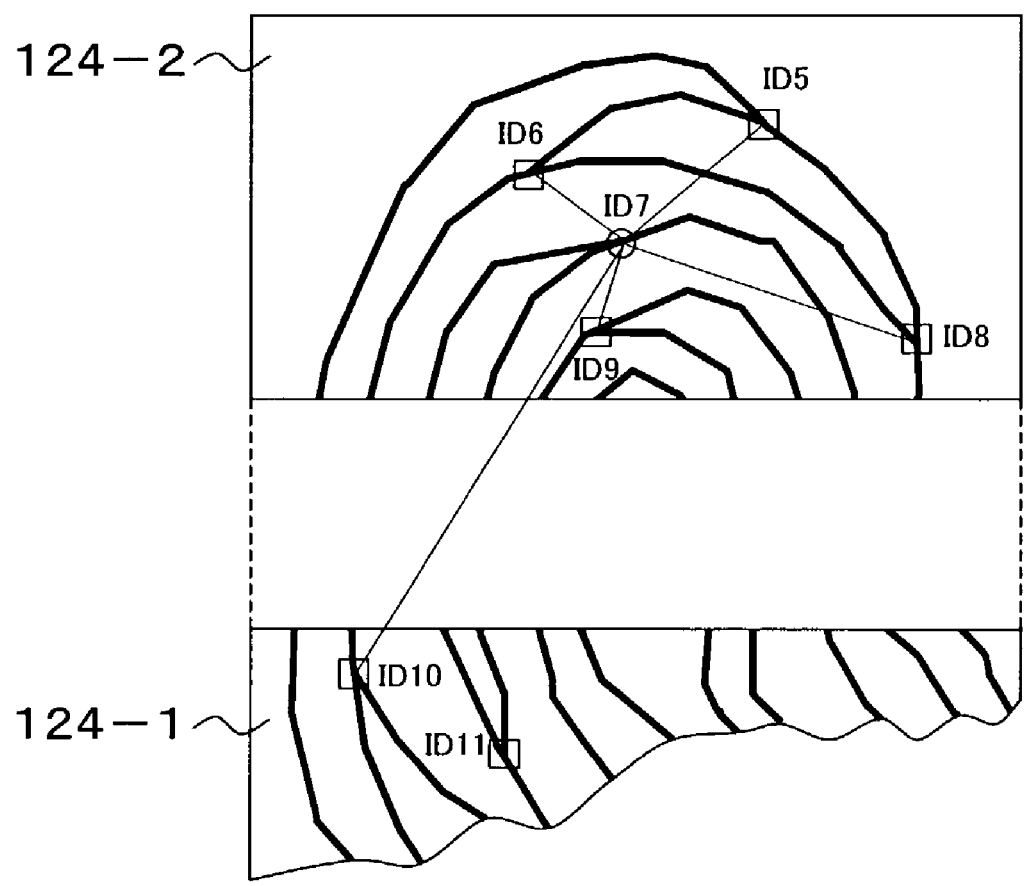
FIG. 16 is a diagram for explaining fingerprint collation according to the embodiment in FIG. 15.

FIG. 16 shows two reconstituted fingerprint images 124-1 and 124-2 including character shapes.

Reference symbols are added each ID5 to ID11 to character points in the reconstituted fingerprint images 124-1 and 124 selected for collation to manage pieces of information belonging to the character points. Of these pieces of information, the information of the interested character point ID7 to be collated includes the position, character type (branch point), and direction of the interested character point ID7, information representing a specific ridge which has a specific relationship and on which the character points ID5, ID6, ID8, and ID9 arranged around the interested character point ID7 in the reconstituted fingerprint image 124-2 and the interested character point ID7 are set, and information representing the positional relationship between the character points ID10 and ID11 in the other reconstituted fingerprint image 124-1. Collation is performed by the following process. The information of the interested character point ID7 is compared and collated with reference data which is registered in advance, specific ridges which have specific relationships and on which the other character points ID5, ID6, ID8, and ID9 included in the same reconstituted fingerprint image 124-2 are set are compared with each other. Collation is also performed to the character points ID10 and ID11 in the similar different reconstituted fingerprint image 124-1 is collated. Since the connection relationship of a reconstituted fingerprint image 124-12 is not known, for example, only positions, types, and directions are collated with each other. In these collation processes, when types, positions, directions, and the like match between the interested character point ID7 and a character point in the same reconstituted fingerprint image 124-2 or the different reconstituted fingerprint image 124-1, a score is given. When pieces of information except for the types such as positions and directions match, and when only the types are different from each other, a score which is smaller than the score obtained when the types also match is given. In this manner, by checking whether a sum of scores given to the interested character point ID7 is a predetermined threshold value or more or not, it is decided whether the interested character point information is matched with corresponding character point information of a finger which is registered in advance or not. Collation between the interested character points described above is executed to the respective character points in at least one of the input reconstituted fingerprint images 124-1 and 124-2. When the number of character points which match is a predetermined number or more, it is decided that the fingerprints match. The scores are calculated to character points subjected to collation. When the sum of scores is a predetermined value or more, it may be decided that the fingerprints match. These two decision references may be combined to each other.

Figure 17:
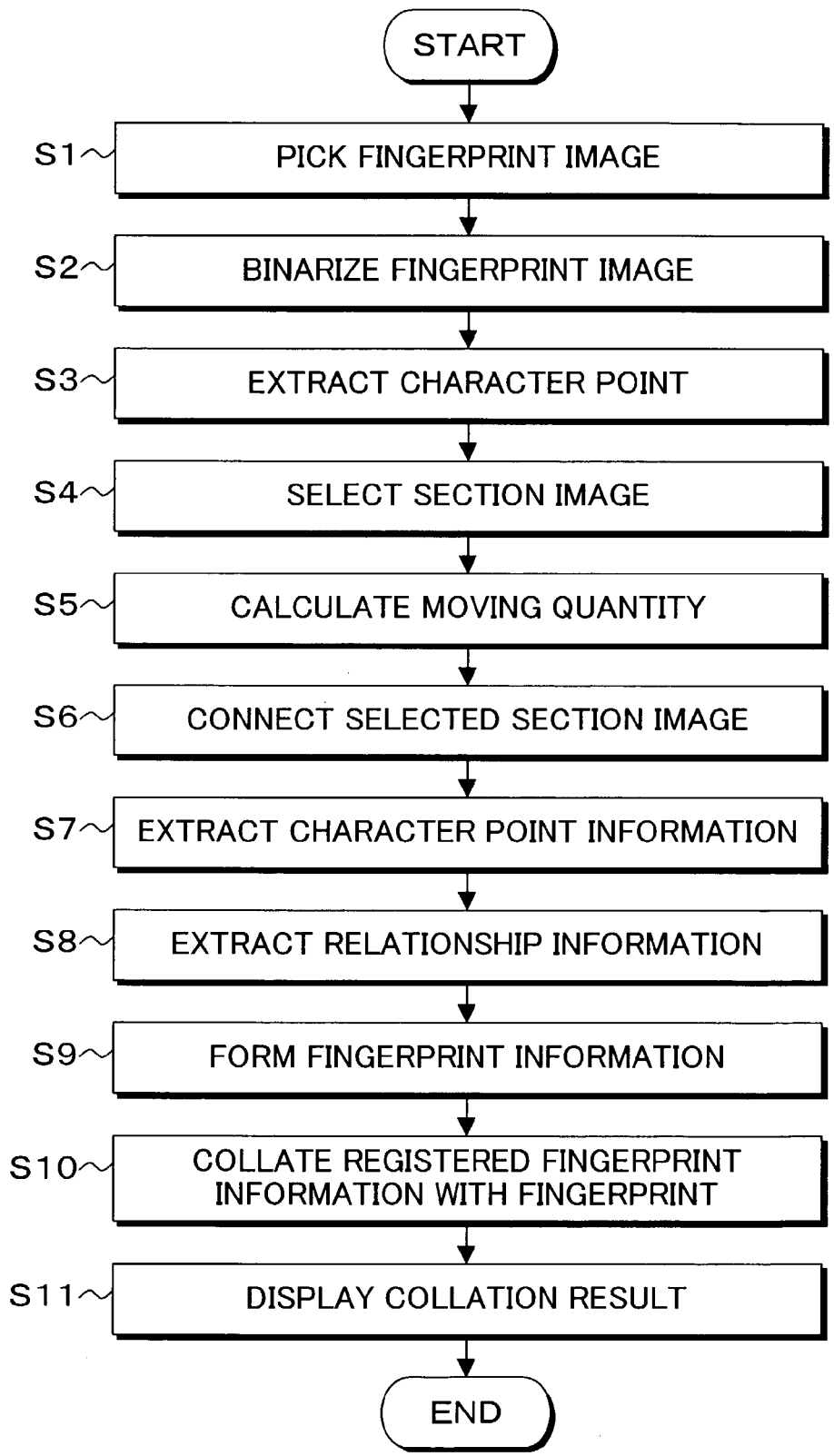
FIG. 17 is a flow chart of an authentication process according to the embodiment in FIG. 15.

FIG. 17 is a flow chart of an authentication process according to the embodiment in FIG. 15.

Continuous fingerprint section images are picked by the fingerprint scanner 100 in step S1, the fingerprint section images are binarized in step S2, and character points such as ridge branch points are extracted in step S3. Subsequently, fingerprint section images having character points are selected in step S4, an amount of movement of a finger of respective image sections which are not selected is calculated in step S5, and the fingerprint section images are connected to each other in step S6. An interested character point is extracted as character point information in step S7. The interested character point is set as a main character point, and the peripheral character points are set as subpoints. Relationship information between these character points is extracted in step S8, and fingerprint information used in collation is formed in step S9. Collation with the fingerprint information registered in advance in step S10 is performed while the center positions are adjusted, and a sum of given scores is calculated from the relationship between the interested character point and the other character points to check an identical person. A collation result is displayed in step S11.

Figure 18:
FIG. 18 is a diagram for explaining fingerprint section images input in the embodiment in FIG. 15.

FIG. 18 shows six fingerprint section images 122-1 to 122-6 as some of fingerprint section images input in the embodiment in FIG. 15. It is assumed that character points exist in the fingerprint section images 122-2, 122-4, to 122-6. In this case, when character points exist at the peripheral portions of the images as in the fingerprint section image 124-4 for connecting the three continuous fingerprint section images 122-4 to 122-6 in which the character points exist, the fingerprint section image 122-3 in which no character portion exists is selected, and a manner of connecting the ridges to each other can also be accurately detected. When the same process is performed to the fingerprint section images 122-3 and 122-2, it can be detected that the character point ID9 in the fingerprint section image 122-2 and the character point ID7 in the fingerprint section image 122-4 exist on adjacent ridges. In this embodiment, when fingerprint section images which do not include character points in a predetermined range extending from the character point or some of fingerprint section images are subjected to connection, the relationship between the character points can be more accurately decided.

As described above, according to the present invention, on input images such as sectional fingerprint images which are continuously picked by a small sensor for a compact device such as a portable phone, character areas are concentrically selected from character portions such as branch points and end points of fingerprint ridges, and the character areas are collided with the registration reference data to check an identical person. For this reason, in comparison with a case in which an entire image is reconstituted by input selected section images to be collated, the loads of the image reconstitution process and the collation process are reduced, and, at the same time, the collation areas are concentrated. For this reason, a memory capacity can be saved, and an authentication process can be performed at a higher accuracy.

In generation of a reconstituted image obtained by connecting living body section images selected as character areas, portions having high degrees of characters such as branch points and end points on fingerprint ridges are extracted to calculate an amount of movement between the images, and the section images are connected to each other. For this reason, the fingerprint section images can be connected to each other without being easily affected by noise or distortion of the images, and connection accuracy when the character areas are reconstituted can be improved. As a result, the accuracy of collation between the reconstituted image with the registration collation data can be improved.

The present invention basically selects characteristic portions from a plurality of input continuous living body section images and collated with each other and collates the characteristic portions with each other, and includes appropriate modifications which do not deteriorate the object and advantage of the invention. In addition, the present invention is not limited to the numerical values described in the above embodiment.

What is claimed is:

1. An authentication method using living body information, comprising:
   the image input step of continuously inputting section images of a human body part by relative movement with respect to a read unit;
   the character area selection step of selecting a living body section image which includes a character shape from an input section image group;
   the image connection step of, when living body section images which include the character shapes which are chronologically continuous are selected, connecting both the living body section images to each other to generate a connected living body image; and
   the collation step of collating the connected living body image including the character shapes and living body section images which include character shapes which are not connected to each other with a corresponding portion in reference information of a human body part which is registered in advance to authenticate an identical person.

2. A method according to claim 1, wherein the character area selection step extracts, as the character shapes of the living body section images, any one of end points and branch points of fingerprint ridges, fingerprint ridge edge lines, portions where changes of tangent directions of the fingerprint ridge edge lines are large, or a combination thereof when the living body section images are fingerprint section images.

3. A method according to claim 1, wherein, in the character area selection step, the character shapes of the respective living body section images are detected, and the number of character shapes is counted, and a living body section image having character shapes the number of which is not less than a predetermined number is selected.

4. A method according to claim 1, wherein, in the image connection step, common areas are searched by correlative calculation of the character shapes in overlapping areas while relatively moving two living body section images which are chronologically continuous to detect relative amounts of movement of the images, and the two living body section images are connected to each other by using the detected amounts of movement.

5. A method according to claim 1, wherein the collation step comprises:
   the moving amount detection step of detecting an amount of movement of a living body section image which does not include the character shape with respect to a living body section image which includes the character shape; and
   the collation reference extraction step of extracting a portion used in collation from the living body reference information on the basis of the amount of movement.

6. A method according to claim 5, wherein, in the moving amount detection step, common areas are searched by correlative calculation of edge lines in overlapping areas while relatively moving two living body section images which are chronologically continuous to detect relative amounts of movement of the images, and a sum of amounts of movement is calculated depending on the number of continuous living body section images which do not include character shapes.

7. A method according to claim 1, wherein
   the character area selection step selects some areas which include the character shapes from a living body section image which includes the character shape, and
   the image connection step connects the some areas which include the character shapes and which are selected from living body section images which are chronologically continuous to generate a connected living body image.

8. A computer-readable medium storing a program for authenticating an identical person, causing a computer to execute:
   the image input step of continuously inputting section images of a human body part by relative movement with respect to a read unit;
   the character area selection step of selecting a living body section image which includes a character shape from an input section image group;
   the image connection step of, when living body section images which include character shapes which are chronologically continuous are selected, connecting both the living body section images to each other to generate a connected living body image; and the collation step of collating the connected living body image including the character shapes and living body section images including the character shapes which are not connected to each other with a corresponding portion in reference information of a human body part which is registered in advance to authenticate an identical person.

9. A computer-readable medium according to claim 8, wherein the character area selection step extracts, as the character shapes of the living body section images, any one of end points and branch points of fingerprint ridges, fingerprint ridge edge lines, portions where changes of tangent directions of the fingerprint ridge edge lines are large, or a combination thereof when the living body section images are fingerprint section images.

10. A computer-readable medium according to claim 8, wherein, in the character area selection step, the character shapes of the respective living body section images are detected, and the number of character shapes is counted, and a living body section image having character shapes the number of which is not less than a predetermined number is selected.

11. A computer-readable medium according to claim 8, wherein, in the image connection step, common areas are searched by correlative calculation of the character shapes in overlapping areas while relatively moving two living body section images which are chronologically continuous to detect relative amounts of movement of the images, and the two living body section images are connected to each other by using the detected amounts of movement.

12. A computer-readable medium according to claim 8, wherein the collation step comprises:

the moving amount detection step of detecting an amount of movement of a living body section image which does not include the character shape with respect to a living body section image which includes the character shape; and the collation reference extraction step of extracting a portion used in collation from the living body reference information on the basis of the amount of movement.

13. A computer-readable medium according to claim 12, wherein, in the moving amount detection step, common areas are searched by correlative calculation of edge lines in overlapping areas while relatively moving two living body section images which are chronologically continuous to detect relative amounts of movement of the images, and a sum of amounts of movement is calculated depending on the number of continuous living body section images which do not include character shapes.

14. A computer-readable medium according to claim 8, wherein the character area selection step selects some areas which include the character shapes from a living body section image which includes the character shape, and the image connection step connects the some areas which include the character shapes and which are selected from living body section images which are chronologically continuous to generate a connected living body image.

15. An authentication apparatus using living body information, comprising:

an image input unit for continuously inputting section images of a human body part by relative movement with respect to a read unit;

a character area selection unit for selecting a living body section image which includes a character shape from an input section image group;

an image connection unit for, when living body section images which include character shapes which are chronologically continuous are selected, connecting both the living body section images to each other to generate a connected living body image; and a collation unit for collating the connected living body image including the character shapes and living body section images including character shapes which are not connected to each other with a corresponding portion in reference information of a human body part which is registered in advance to authenticate an identical person.

* * * * *